United States Patent
Fricke et al.

[11] Patent Number: 6,112,586
[45] Date of Patent: Sep. 5, 2000

[54] EFFECTIVE ROAD PROFILE SIMULATION METHOD AND SYSTEM WITH TIRES LOSS-OF-CONTACT COMPENSATION

[75] Inventors: David M. Fricke, Howell; Fayyaz Saleem, Taylor; Lawrence A. Mianzo, Plymouth; Rakan C. Chabaan, Farmington Hills, all of Mich.

[73] Assignee: Ford Global Technologies, Inc., Dearborn, Mich.

[21] Appl. No.: 09/146,390

[22] Filed: Aug. 31, 1998

[51] Int. Cl.[7] .................................................. E01C 23/00
[52] U.S. Cl. ............................................................ 73/146
[58] Field of Search ................................................ 73/146

[56] References Cited

U.S. PATENT DOCUMENTS 5,065,618  11/1991  Hodges et al. ............................. 73/146
5,610,330   3/1997  Fricke et al. .

*Primary Examiner*—Joseph L. Felber
*Attorney, Agent, or Firm*—David B. Kelley

[57] ABSTRACT

A method and system for controlling an automotive vehicle spindle-coupled road simulator with a predetermined effective road profile for a road surface uses tire loss-of-contact compensation to modify the tracking parameter in a control loop to avoid incorrectly loading a test vehicle. Tire deflection obtained during measurement of a vehicle's tire profile calculation is used to detect and flag regions where the tire profile is not a function of the road input so that the tire profile motion is governed only by the free dynamic response of the suspension. A tire model is first developed for a vehicle. The vehicle is then coupled to the spindle-coupled simulator, and a set of control signals is generated in a control loop. The control signals are used for driving the spindle-coupled simulator with the vehicle attached thereto so that a response generated by the simulator is consistent with the predetermined effective tire profile. Determination of the set of control signals includes selection of a composite tracking response from a generated output representing a tire in contact with the road surface and a tire deflection output representing a tire having lost contact with the road surface.

15 Claims, 3 Drawing Sheets

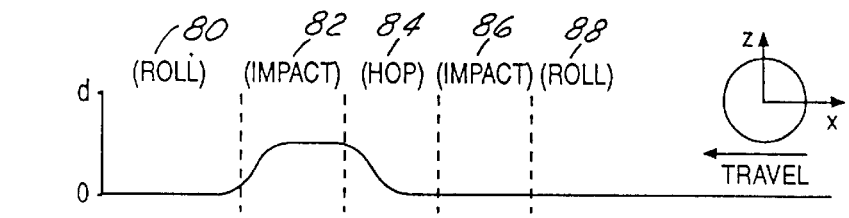
FIG. 3
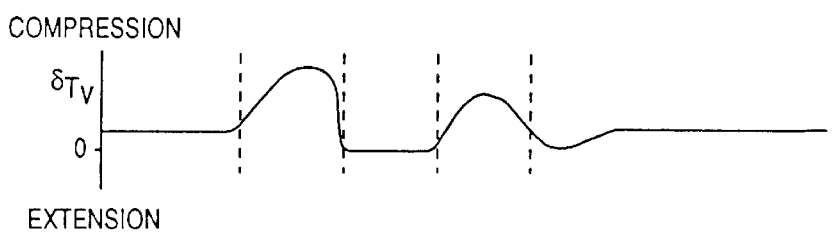
FIG. 4A
FIG. 4B
FIG. 4C
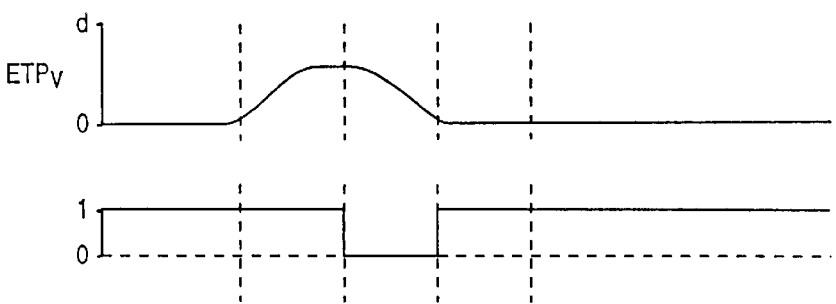
FIG. 5A
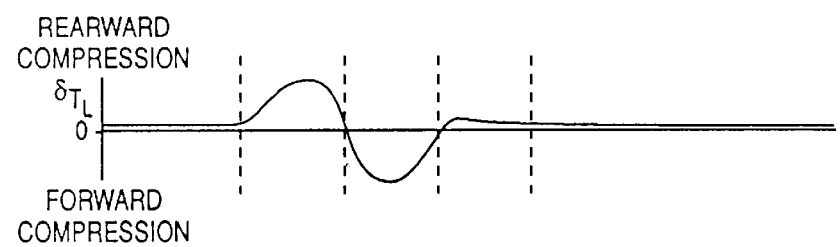
FIG. 5B
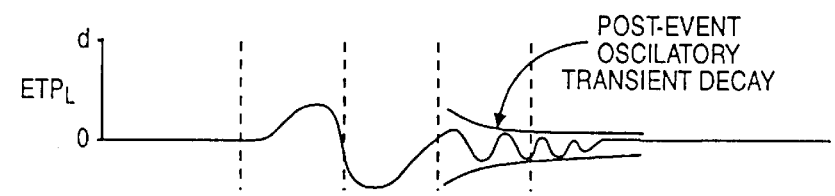
FIG. 5C
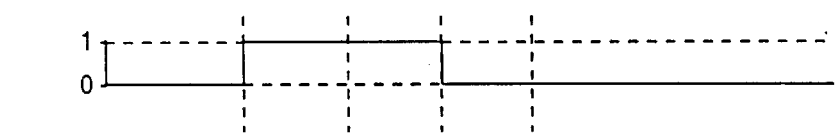

EFFECTIVE ROAD PROFILE SIMULATION METHOD AND SYSTEM WITH TIRES LOSS-OF-CONTACT COMPENSATION

FIELD OF THE INVENTION

The present invention relates generally to automotive vehicle road simulation, and more particularly to automotive simulation through use of spindle-coupled road simulators.

BACKGROUND OF THE INVENTION

An effective road profile control (ERPC) process for use with spindle-coupled road simulators, as disclosed in U.S. Pat. No. 5,610,330, assigned to the assignee of the present invention and incorporated herein by reference, provides a method by which measured vehicle data from a first vehicle can be used to develop a valid simulation test for subsequent vehicles. The process uses an analytical tire model to predict a tire profile which is consistent with vehicle dynamics, including spindle force and acceleration, from the first vehicle. In developing the simulation test on subsequent vehicles, a second tire model is used as a parametric observer in the system tracking-control process, generating a test where the predicted tire profile of the measurement and test vehicles are the same.

This approach to simulation test control assumes that the longitudinal, lateral, and vertical tire profile displacements are independent of the vehicle and only a function of the road surface. This assumption is normally valid for most regions of a measured road surface, since the tire profile is normally being directly loaded by the road, and the tire profile and the road profile are coincidental. For some road events, however, the tire profile can be independent of the road profile. These events may include tire hop, where the tire loses vertical contact with the road surface. In this situation, the tire is momentarily free of the influence of the road profile, but typically quickly reengages with the road.

Another potential problem with the assumption that the tire profile matches the road profile occurs in the longitudinal control axis. A free rolling tire on a smooth surface, such as between pot holes or bumps, can have longitudinal tire profile motion which is a function of only the vehicle. Transient response oscillations of the suspension following an impact event are dictated by the dynamics of the suspension alone, which may be dependent on suspension mass, stiffness, damping and other parameters. Under these conditions, forcing a calculated longitudinal tire profile to match a previous vehicle's tire profile may not be accurate.

While the above recited patent represents a significant advance in the art, further advances are needed to overcome the above described problems.

SUMMARY OF THE INVENTION

The present invention provides an ERPC process having loss-of-contact compensation. The process uses the tire deflection obtained during calculation of a vehicle's tire profile to detect and flag regions where the tire profile is not a function of the road input. When a net tire deflection is zero, the tire profile motion is governed only by the free dynamic response of the suspension. Zero net tire deflection is common in the vertical direction during brief periods of tire hop. It is also common for longitudinal profile motion during free rolling between impact events. Proper simulation testing over these time regions on subsequent vehicles requires a modification in the calculation of the tracking control parameter to avoid incorrectly loading a test vehicle.

The simulation control tracking parameter is normally the calculated tire profile. During loss-of-contact regions, the correct desired tire profile cannot be determined beforehand. It can be assumed, however, that during these time regions the correct tire profile motion will be a function of free suspension transient response, as on the original measurement vehicle. To achieve a proper simulation during these regions, tire profile tracking error is determined based upon calculated tire deflection, rather than the difference between desired and achieved tire profile displacement. The objective in a loss-of-contact region is to generate a test input that is consistent with zero net tire deflection, that is, a free transient response condition. Effectively, this generates a condition for the vehicle under test where only the reflected inertia of the virtual tire and wheel acts to externally load the spindle.

The method of the present invention for controlling an automotive vehicle spindle-coupled road simulator with a predetermined effective tire profile for a road surface begins with the step of developing a tire model for a vehicle. The vehicle is then coupled to the spindle-coupled simulator, and a set of control signals is generated in a tracking control process. The control signals are used for driving the spindle-coupled simulator with the vehicle attached thereto so that a response generated by the simulator is consistent with the predetermined effective tire profile. Determination of the set of control signals includes appropriate selection of a tracking parameter from a generated output representing a tire in contact with the road surface and a tire deflection output representing a tire having lost contact with the road surface.

The system of the present invention for simulating a road test of an automotive vehicle comprising a spindle-coupled simulator adapted to receive the vehicle thereon, electronic memory means for storing a set of data representing a desired response from a source vehicle driven over a road surface, loss-of-contact control code for selecting a tracking response from among a generated output from the spindle-coupled simulator representing a tire in contact with the road surface, and a tire deflection representing a tire having lost contact with the road surface, and tracking control loop code means for driving the spindle-coupled simulator.

An advantage of the present invention is a method for controlling an automotive vehicle spindle-coupled road simulator which includes tire loss-of-contact with a road surface during simulation.

A feature of the present invention is detection of loss-of-contact of a tire in a predetermined effective tire profile and selection of an effective tire profile error from either a generated output from a simulator control plant representing a tire in contact with the road surface, and a calculated tire deflection representing a tire having lost contact with the road surface.

BRIEF DESCRIPTION OF THE DRAWINGS

These and other objects, advantages, and features of the present invention will be apparent to those skilled in the art upon reading the following description with reference to the accompanying drawings, in which:

FIG. 3 is a graph showing a road event in which a vehicle tire loses contact with a road surface;

FIGS. 4A–4C are graphs showing a tire deflection, a tire profile, and an effective road profile flag, respectively, for a vertical component of a vehicle tire position during the road event of FIG. 3; and FIGS. 5A–5C are graphs showing tire deflection, tire profile, and an effective road profile flag, respectively, for a longitudinal component of a vehicle tire position during the road event of FIG. 3.

DETAILED DESCRIPTION OF THE PREFERRED EMBODIMENT

Figure 1:
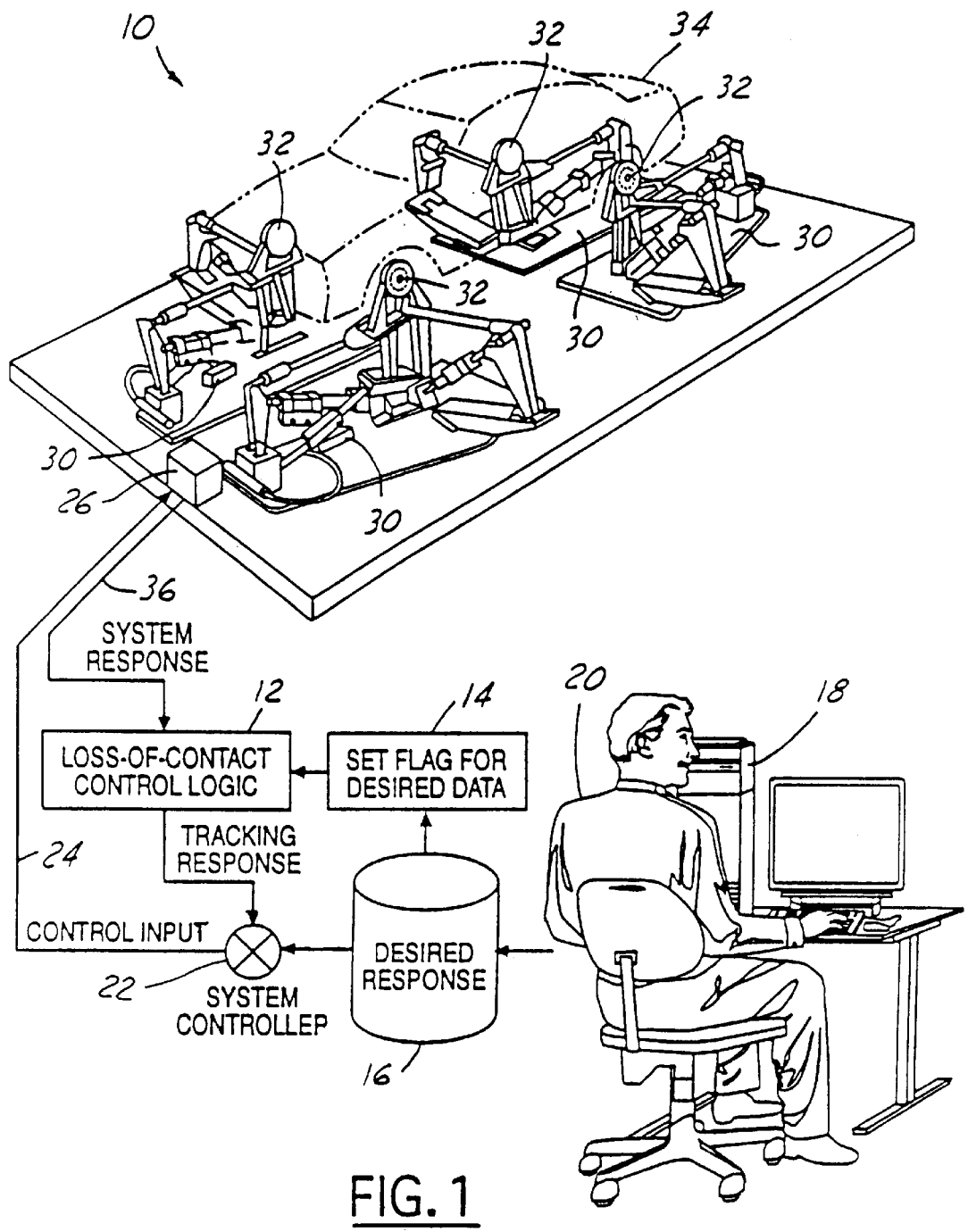
FIG. 1 is a system view of the present invention showing a spindle-coupled simulator using coupled tire means and loss-of-contact control logic to develop an effective road profile tracking control parameter, the system being computer controlled.

Turning now to the drawings, and in particular to FIG. 1 thereof, a spindle-coupled simulator 10 is shown with a computer-implemented system for control thereof. The computer-implemented control features loss-of-contact control logic 12, which is triggered based upon flags set for desired data, indicated at 14. The flags in box 14 are set based upon a desired response 16 obtained from proving ground road tests, as further described below. The loss-of-contact control method is implemented on a computer 18 and can be monitored and/or modified by a user 20. A summer 22 develops an input 24 from the loss-of-contact models 12 and the desired response 16, and the sum 24 is then input into a control module 26 for the spindle-coupled simulator 10. The spindle-coupled simulator 10 has a simulator controlled apparatus 30 connected at each vehicle spindle 32 after the tires of a vehicle 34 have been removed. The spindle-coupled simulator 10 can introduce from three to five forces and moments at each vehicle speed spindle 32 so as to comprehensively test the complete vehicle for structural durability, except for internal powertrain components. An achieved response 36 from the spindle-coupled simulator 10 is input to the loss-of-contact model 12 to complete the loop.

Figure 2:
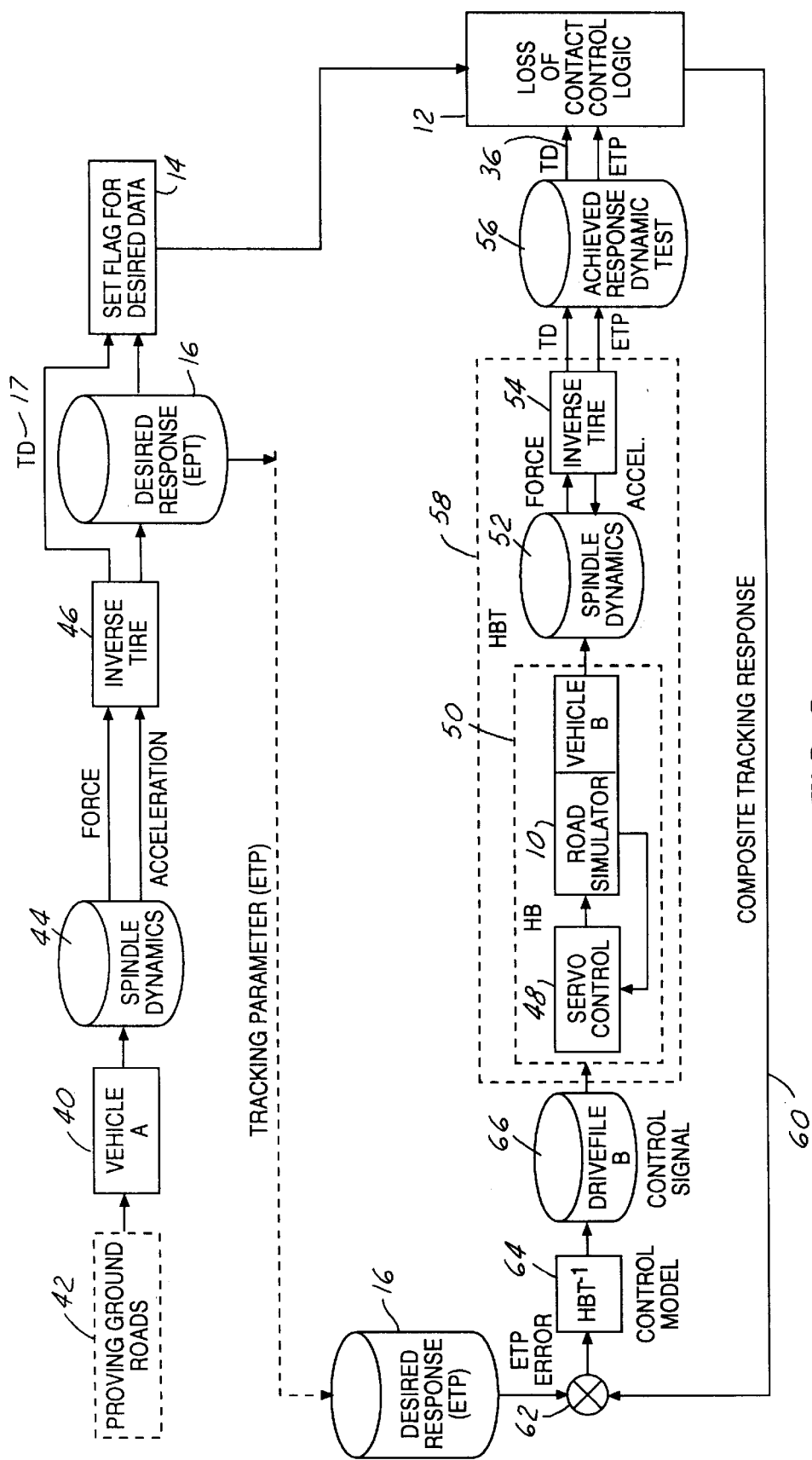
FIG. 2 is a flow chart of an effective road profile simulation method with tire loss-of-contact compensation according to the present invention.

Turning now to FIG. 2, a flow chart showing a preferred embodiment of the method of the present invention is shown. A vehicle A, indicated at 40, is driven over a test road at proving ground facilities, indicated at 42. Spindle dynamics data at 44 is collected and used with an inverse tire model, such as described in U.S. Pat. No. 5,750,890, assigned to the assignee of the present invention and incorporated herein by reference, to develop an effective tire profile, or desired response 16, and a tire deflection parameter 17, which identifies tire deflection with respect to a predetermined threshold value, for example a pre-load tire deflection. From the tire deflection parameter 17, an effective road profile flag is set for a vertical and longitudinal component of the tire position, as indicated in box 14 and further discussed below.

Vehicle B, which has a different configuration than that of Vehicle A, is coupled to the spindle-coupled simulator 10. A servo-controller 48, such as a conventional servo-control apparatus, is used for control of the road simulator. System modeling of the Vehicle B, the road simulator 10, and the servo-controller 48, collectively comprise a transfer function HB, indicated generally at 50. Spindle dynamics data for Vehicle B, indicated at cylinder 52, are generated from the road simulator 10 with Vehicle B attached thereto. The spindle dynamics data 52 is then used in conjunction with the inverse tire model 54 for Vehicle B to yield an achieved response 56. The transfer function HB, the spindle dynamics 52, and the inverse tire model 54, collectively comprise a transfer function HBT, indicated generally at 58.

A signal 36 representing the achieved response 56 is then used in conjunction with the loss-of-contact control logic 12, further discussed below, to produce a composite tracking response 60. A sum between the desired response 16 and the composite tracking response 60 is calculated at the summer 62 and is operated on by an inverse transfer function $HBT_1$, indicated at 64, before being written to a drive file B, indicated generally at cylinder 66. The set of control signals thus generated in the drive file B represents a unique control input for a particular simulator-vehicle-controller combination. The Vehicle B can then be further tested while coupled to the spindle-coupled simulator without the need for driving it over the test road.

Turning now to FIG. 3, a "road event" resulting in tire loss-of-contact with a road surface is shown in graphical form. Such an event may be representative of, for example, a bump or other obstruction in the road surface which causes a vehicle tire to temporarily depart from the surface. The road event can be separated into five sections, including a pre-impact "roll" section 80, a "bump" impact section 82, a "hop" section 84, a road "impact" section 86, and a post-impact "roll" section 88. Those skilled in the art will recognize that the road event graphically depicted in FIG. 3 is but one of many road events for which the loss-of-contact method and system described herein is applicable. The horizontal axis of the graph is longitudinal travel, in the x-direction, while the vertical axis represents vertical road surface displacement, in the z-direction.

In FIG. 4A, a vertical tire deflection graph is shown separated into road event sections corresponding to those described above with reference to FIG. 3. The horizontal axis corresponds to longitudinal vehicle travel, and the vertical axis is computed vertical tire deflection. The vertical tire deflection is calculated as follows:

$$\delta_{Tv} = [F_{vert.} - mz]*[k]_T^{-1},$$

where, $\delta_{Tv}$=vertical tire deflection, $F_{vert.}$=vertical force measured at a vehicle spindle, m=at spindle-coupled mass, z=vertical spindle acceleration, and $[k]_T$=a tire stiffness model.

From FIG. 4A, it can be seen that the vertical tire deflection is normally in compression during pre-impact and post-impact rolling sections of a road event. This compression is due to vehicle weight on the tires. During the impact sections of the road event, sections 82 and 86 of FIG. 3, the vertical tire deflection is in greater compression than during the rolling sections 80 and 88, respectively. The hop section 84 is of particular interest. During that section of the road event, the vertical tire deflection is zero since the vehicle mass is no longer loading the tire against the road surface. That is, the tire is no longer in contact with the road surface.

As shown in FIG. 4B, a vertical tire profile can be determined as follows:

$$ETP_v = \delta_{Tv} + z$$

where, z=vertical spindle displacement and $ETP_v$=vertical effective tire profile. This vertical effective tire profile can, for the most part, be used as the effective road profile when the net vertical deflection is greater than zero. During those periods, an effective road profile flag is set equal to one. However, when the net tire deflection is less than or equal to zero, the effective road profile in the vertical direction is undefined since the vehicle tire is no longer in contact with the road surface. During that time, the effective road profile flag is set equal to zero, as seen in FIG. 4C. These flags are set as shown in box 14 of FIG. 2 and used as shown in Box 12 to select the appropriate signal for the composite tracking response 60 between a generated output from the control loop representing a tire in contact with the road surface and a tire deflection representing a tire having lost contact with the road surface. This loss-of-contact control logic, box 12 of FIG. 2, can be represented as follows:

$$ETP_{v\ error} = ETP_{v\ desired} * ERP\text{-}FLAG_{v\ desired} * \quad \text{(desired}$$
$$ERP\text{-}FLAG_{v\ achieved} - \quad \text{response)}$$
$$ETP_{v\ achieved} * ERP\text{-}FLAG_{v\ desired} * \quad \text{(composite}$$
$$ERP\text{-}FLAG_{v\ achieved} - \delta_{Tv} * \quad \text{tracking response)}$$
$$[1 - ERP\text{-}FLAG_{v\ achieved}],$$

where, $ETP_{v\ desired}$=the vertical effective tire profile from the desired response in cylinder 16 of FIG. 2, $ETP_{v\ achieved}$=the vertical effective tire profile from the achieved response of the dynamic test in cylinder 56 of FIG. 2, $ERP\text{-}FLAG_{v\ achieved}$=the vertical effective road profile flag, as described above, for the desired response, and $ERP\text{-}FLAG_{desired}$=the effective road profile flag as described above for the achieved response. The effect of this loss-of-contact model is to determine a tracking error for control using the difference between the desired and the achieved responses as an input to the control loop of FIG. 2 where both the desired and achieved effective road profiles are defined, that is, where the tire is in contact with the road surface. Where the desired effective road profile is not defined, that is, where the $ERP\text{-}FLAG_{desired}$ is zero, no error exists, unless, in the case where tire extension is predicted for this test vehicle. Then the effective tire profile error ($ETP_{error}$) is equal to the tire deflection ($\delta_{Tv}$), and the control loop will eventually remove the tire extension error.

Graphs depicting a longitudinal tire deflection, a longitudinal tire profile, and an effective road profile flag for the longitudinal component as shown, respectively, in FIGS. 5A–5C. Both a longitudinal tire deflection, $\delta_{Tl}$, and a longitudinal effective tire profile, $ETP_L$, are determined as shown in FIGS. 4A and 4B, respectively, in a fashion similar to those parameters for the vertical direction as follows:

$$\delta_{Tl}=[F_{long}-mz]*[k]_T^{-1},$$

where, $\delta_{Tl}$=longitudinal tire deflection, $F_{long}$=longitudinal force measured at a vehicle spindle, m=at spindle-coupled mass, z=longitudinal spindle acceleration, and $[k]_T$=a tire stiffness model.

$$ETP_1=\delta_{Tl}+z$$

where, z=longitudinal spindle displacement and $ETP_1$= longitudinal effective tire profile.

An effective road profile graph, shown in FIG. 5C, is developed based upon the absolute value of the net longitudinal tire deflection. If the absolute value of the net longitudinal tire deflection is greater than a predetermined threshold value, then the effective road profile in the longitudinal direction ($ERP_L$) is equal to the effective tire profile in the longitudinal direction ($ETP_L$) and the ERP FLAG$_L$ set to 1. However, if the absolute value of the net longitudinal tire deflection is less than the predetermined threshold, then the effective road profile in the longitudinal direction is undefined, and an effective road profile flag for the longitudinal direction is set equal to zero. An effective tire profile error, $ETP_{L\ error}$, is determined as follows:

$$ETP_{L\ error} = ETP_{L\ desired} * ERP\text{-}FLAG_{L\ desired} - \quad \text{(desired response)}$$
$$ETP_{L\ achieved} * ERP\text{-}FLAG_{L\ desired} - \quad \text{(composite tracking}$$
$$\delta_{Tl} * [1 - ERP\text{-}FLAG_{L\ achieved}], \quad \text{response)}$$

The threshold is based on the steady-state tire deflection generated by the nominal rolling resistance of the tire. It is typically empirically determined based upon a set of vehicle road measurements, but will generally be quite low. Where the longitudinal effective road profile is defined, that is, where longitudinal tire deflection is caused by contact with the road surface, a longitudinal effective tire profile error is set equal to the difference between a predetermined longitudinal effective tire profile and a longitudinal component of the generated output from the control loop. That is, if a loss-of-contact condition has not been flagged for the predetermined longitudinal effective tire profile, the longitudinal effective tire profile error, or component longitudinal error, is the difference between the desired longitudinal effective tire profile and the achieved longitudinal effective tire profile. However, where a loss-of-contact condition is flagged, the longitudinal ETP error is set equal to the achieved longitudinal tire deflection, that is, $\delta_{Tl}$.

In both the vertical and longitudinal loss-of-contact models described above, a flagged condition essentially corresponds to a situation where the vehicle spindle response is modeled as a free transient system response.

In one embodiment of the method according to the present invention, a first tire model is developed for a first vehicle, and a tire profile is estimated for a road surface over which the first vehicle was driven. An estimate of the tire profile is made based upon a set of spindle dynamics data for the first vehicle and the first tire model. A second tire model is then developed for a second vehicle, and the second vehicle is then coupled to a spindle-coupled simulator. A set of control signals is generated in a tracking control process for driving the spindle-coupled simulator with the second vehicle attached thereto so that a response generated by the spindle-coupled simulator is consistent with the estimated tire profile. The set of control signals is generated by selecting a signal for an effective tire profile error, or from a generated composite output from the control loop representing a tire in contact with the road surface and a tire deflection representing a tire having lost contact with the road surface.

The control loop has an input formed by the difference between the predetermined effective tire profile and the achieved composite tracking response. A loss-of-contact condition in the predetermined tire deflection profile is flagged by determining if a dynamic tire deflection exceeds a pre-load tire deflection. If a loss-of-contact condition is flagged, a tire deflection is calculated for use in calculating the effective tire profile error in the control loop during simulation with the second vehicle coupled to the spindle-coupled simulator. In addition, a loss-of-contact condition can be dynamically flagged for the response generated by the spindle-coupled simulator with the second vehicle attached thereto.

Preferably, the input error in the control loop is comprised of a vertical input error and a longitudinal input error. The vertical input error is set equal to the difference between a predetermined vertical effective tire profile and the generated output from the control loop if a loss-of-contact condition has not been flagged for either signal, setting the input error to zero where both of the signals have been flagged, and setting the input error to a vertical tire deflection if only the generated output from the control loop has been flagged. The longitudinal input error is set equal to the difference between a predetermined longitudinal effective tire profile and a longitudinal component of the generated output from the control loop if a loss-of-contact condition has not been flagged for the predetermined longitudinal effective tire profile. However, the longitudinal input error is set equal to the generated longitudinal tire deflection if the predetermined longitudinal effective tire profile has been flagged.

Although the preferred embodiment of the present invention has been disclosed, various changes and modifications may be made without departing from the scope of the invention as set forth in the appended claims.

We claim:

1. A method for controlling an automotive vehicle spindle-coupled road simulator with a predetermined effective tire profile for a road surface, the method comprising the steps of:

developing a tire model for a vehicle;

coupling said vehicle to said spindle-coupled simulator;

generating a set of control signals in a tracking control loop for driving said spindle-coupled simulator with said vehicle attached thereto so that a response generated by said spindle-coupled simulator is consistent with said predetermined effective tire profile; and selecting a signal for calculating an effective tire profile error from a generated output from the control loop representing a tire in contact with the road surface, and a tire deflection representing a tire having lost contact with the road surface.

2. The method according to claim 1 wherein said control loop has an input formed by a difference between the predetermined effective tire profile and the composite tracking response from the control loop.

3. The method according to claim 1 including the step of flagging a loss-of-contact condition in a predetermined tire deflection profile by determining if a dynamic tire deflection exceeds a pre-load tire deflection, and calculating a tire deflection for use as a tracking response parameter in the control loop when a loss-of-contact condition is flagged.

4. The method according to claim 3 including the step of flagging a loss-of-contact condition in the response generated by the spindle-coupled simulator.

5. The method according to claim 4 wherein a input error is comprised of a vertical input error and a longitudinal input error.

6. The method according to claim 5 including the vertical step of setting the vertical input error to the difference between a predetermined vertical effective tire profile and the generated output from the control loop if a loss-of-contact condition has not been flagged for either signal, setting the input error to zero where both of the signals have been flagged, and setting the input error to a vertical tire deflection if only the generated output from the control loop has been flagged.

7. The method according to claim 5 including the step of setting the longitudinal input error to the difference between a predetermined longitudinal effective tire profile and a longitudinal component of the generated output from the control loop if a loss-of-contact condition has not been flagged for predetermined longitudinal effective tire profile, and setting the longitudinal input error to a generated longitudinal tire deflection if the predetermined longitudinal effective tire profile has been flagged.

8. A method for controlling an automotive vehicle spindle-coupled road simulator comprising the steps of:

developing a first tire model for a first vehicle;

estimating a tire profile for a road surface over which said first vehicle was driven based upon a set of spindle dynamics data for said first vehicle and said first tire model;

developing a second tire model for a second vehicle;

coupling said second vehicle to said spindle-coupled simulator; and generating a set of control signals in a tracking control loop for driving said spindle-coupled simulator with said second vehicle attached thereto so that a response generated by said spindle-coupled simulator is consistent with said estimated tire profile, said set of control signals generated by selecting a signal for calculation of an effective tire profile error from a generated output from the control loop representing a tire in contact with the road surface and a tire deflection representing a tire having lost contact with the road surface.

9. The method according to claim 8 wherein said control loop has an input formed by the difference between a predetermined effective tire profile and a composite tracking response from the control loop.

10. The method according to claim 8 including the step of flagging a loss-of-contact condition in said predetermined tire deflection profile by determining if a dynamic tire deflection exceeds a pre-load tire deflection, and calculating a tire deflection for use as a tracking response parameter in the control loop when a loss-of-contact condition is flagged.

11. The method according to claim 10 including an step of flagging a loss-of-contact condition in the response generated by the spindle-coupled simulator.

12. The method according to claim 11 wherein an input error is comprised of a vertical input error and a longitudinal input error.

13. The method according to claim 12 including the step of setting the vertical input error to the difference between a predetermined vertical effective tire profile and the generated output from the control loop if a loss-of-contact condition has not been flagged for either signal, setting the input error to zero where both of the signals have been flagged, and setting the vertical input error to a vertical tire deflection if only the generated output from the control loop has been flagged.

14. The method according to claim 12 including the step of setting the longitudinal input error to the difference between a predetermined longitudinal effective tire profile and a longitudinal component of the generated output from the control loop if a loss-of-contact condition has not been flagged for the predetermined longitudinal effective tire profile, and setting the longitudinal input error to a generated longitudinal tire deflection if the predetermined longitudinal effective tire profile has been flagged.

15. A system for simulating a road test of an automotive vehicle on a spindle-coupled simulator adapted to receive the vehicle thereon, the system comprising:

electronic memory means for storing a set of data representing a desired response from a source vehicle driven over a road surface;

loss-of-contact control means for selecting a tracking response from among a generated output from the spindle-coupled simulator representing a tire in contact with the road surface, and a tire deflection representing a tire having lost contact with the road surface; and tracking control loop code means for driving the spindle-coupled simulator.

* * * * *